United States Patent
Wang

(10) Patent No.: US 9,964,773 B2
(45) Date of Patent: May 8, 2018

(54) TRUE THREE-DIMENSIONAL VOLUMETRIC IMAGING DEVICE AND DISPLAY DEVICE

(71) Applicant: BOE TECHNOLOGY GROUP CO., LTD., Beijing (CN)

(72) Inventor: Shang Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 31 days.

(21) Appl. No.: 14/422,836

(22) PCT Filed: Mar. 17, 2014

(86) PCT No.: PCT/CN2014/073538
§ 371 (c)(1),
(2) Date: Feb. 20, 2015

(87) PCT Pub. No.: WO2015/120646
PCT Pub. Date: Aug. 20, 2015

(65) Prior Publication Data
US 2016/0033780 A1    Feb. 4, 2016

(30) Foreign Application Priority Data
Feb. 14, 2014  (CN) .......................... 2014 1 0051729

(51) Int. Cl.
*G02B 27/22*    (2018.01)
*G02B 26/10*    (2006.01)
(Continued)

(52) U.S. Cl.
CPC ....... *G02B 27/2285* (2013.01); *G02B 5/0289* (2013.01); *G02B 26/101* (2013.01);
(Continued)

(58) Field of Classification Search
CPC ................ G02B 27/22; G02B 27/2242; G02B 27/2264; G02B 27/2278; G02B 27/2285;
(Continued)

(56) References Cited

U.S. PATENT DOCUMENTS 7,098,872 B2    8/2006  Geng
2004/0027450 A1*  2/2004  Yoshino ............. H04N 13/0495
                                    348/42
(Continued)

FOREIGN PATENT DOCUMENTS

CN    1044347 A    8/1990
CN    1366197 A    8/2002
(Continued)

OTHER PUBLICATIONS

Chinese Office Action dated Aug. 19, 2015 issued in corresponding Chinese Application No. 201410051729.1 along with its English translation.

(Continued)

*Primary Examiner* — Marin Pichler
(74) *Attorney, Agent, or Firm* — Nath, Goldberg & Meyer; Joshua B. Goldberg

(57) ABSTRACT

A true three-dimensional volumetric imaging device includes an imaging light source, a light source adjusting unit, an imaging plate, and a movement driving unit. The light source adjusting unit is arranged between the imaging light source and the imaging plate, and the imaging plate is connected to the movement driving unit. A light beam emitted from the imaging light source is incident onto the imaging plate after being adjusted by the light source adjusting unit, and the movement driving unit causes the imaging plate to oscillate in a direction parallel to an outgoing direction of the light beam emitted from the imaging light source. In the true three-dimensional volu- (Continued)

metric imaging device, the true three-dimensional volumetric display of an image is achieved. An algorithm herein is simpler, and a more complete volumetric object can be shown.

18 Claims, 3 Drawing Sheets

(51) Int. Cl.
*G02B 5/02* (2006.01)
*G03B 21/56* (2006.01)
*H04N 9/31* (2006.01)
*G09F 13/34* (2006.01)
*H04N 13/04* (2006.01)
*G02B 1/11* (2015.01)

(52) U.S. Cl.
CPC ....... *G02B 26/108* (2013.01); *G02B 27/2278* (2013.01); *G03B 21/562* (2013.01); *G09F 13/34* (2013.01); *H04N 9/3129* (2013.01); *H04N 13/0493* (2013.01); *G02B 1/11* (2013.01)

(58) Field of Classification Search
CPC .. G02B 5/0289; G02B 26/101; G02B 26/108; G02B 27/2292; G02B 27/227; H04N 9/3129; H04N 13/0488; H04N 13/0493; H04N 13/0495; H04N 13/049521
USPC ............ 345/32, 424; 353/7; 349/15; 348/51, 348/54, 55; 359/462–477, 201.1
See application file for complete search history.

(56) References Cited

U.S. PATENT DOCUMENTS

2005/0169572 A1* 8/2005 Itoh .................... G02B 27/0994
                                                                385/15
2007/0070062 A1* 3/2007 Boll ................... H04N 13/0493
                                                                345/419

FOREIGN PATENT DOCUMENTS

| CN | 1810046 A | 7/2006 |
| CN | 101881922 A | 11/2010 |
| CN | 102841448 A | 12/2012 |
| CN | 103048869 A | 4/2013 |
| CN | 103207513 A | 7/2013 |
| JP | H09189884 A | 7/1997 |
| JP | 2000287225 A | 10/2000 |
| JP | 2008268694 A | 11/2008 |

OTHER PUBLICATIONS

Written Opinion of the International Searching Authority issued in corresponding International Application No. PCT/CN2014/073538.
International Search Report for International Application No. PCT/CN2014/073538.
2nd Office Action issued in Chinese application No. 201410051729.1 dated Jan. 7, 2016.

* cited by examiner

TRUE THREE-DIMENSIONAL VOLUMETRIC IMAGING DEVICE AND DISPLAY DEVICE

FIELD OF THE INVENTION

The present invention relates to the field of display technology, in particular, relates to a true three-dimensional volumetric imaging device and a display device.

BACKGROUND OF THE INVENTION

A true three-dimensional volumetric display technology is a completely new three-dimensional image display technology, based on which a three-dimensional image having physical depth of field can be viewed directly. The true three-dimensional volumetric display technology will lead the scientific visualization into a new development area, and has broad application prospect. Briefly, a true three-dimensional display is a technology capable of reproducing image information in a true three-dimensional space which really has width, height, and depth. In the prior art, one feasible implementation is to form a voxel by exciting a material located within a transparent space in an appropriate manner, and by generation, absorption, or scattering of visible radiation.

The true three-dimensional volumetric display technology may be classified as a static imaging technology and a dynamic body scanning technology according to the way in which an imaging space is constituted. The imaging space of the static imaging technology is a stationary three-dimensional space, whereas the imaging space of the dynamic body scanning technology is a three-dimensional space formed by periodic motion of a display device.

The static imaging technology is as follows. In a three-dimensional space formed of a transparent material, two beams of laser are projected into an imaging space by an excitation source, the two beams of laser intersect at a point after subjecting to refraction, thereby forming a voxel which is the smallest unit constituting a volumetric image and having its own physical depth of field. Each voxel point corresponds to an actual point constituting a real object. Numerous intersection points are formed in the three-dimensional space when the two beams of laser move quickly, and thus a true three-dimensional volumetric image having true physical depth of field is constituted by numerous voxel points. The static imaging technology is limited in application because it can only generate a static image.

The dynamic body scanning technology is as follows. The imaging space thereof is formed by periodic motion of a display device, for example, a three-dimensional imaging space is formed by the rotary motion of a screen. In this technology, a volumetric image to be displayed is projected, in a manner of two-dimensional slice, onto a screen in a certain way, and the screen rotates at a high speed at the same time. What viewed by human eyes are not discrete two-dimensional pictures, but a three-dimensional volumetric image constituted by the two-dimensional pictures due to visual persistence of human eyes. However, since the structure of three-dimensional volumetric imaging in the dynamic body scanning technology is complicated, a mature and valid imaging structure for practical application does not exist at present. Further, the imaging manner thereof has a very complicated algorithm because it relates to intersection and disposition of a plurality of points, surfaces, and spaces.

SUMMARY OF THE INVENTION

In view of the above technical problems existing in the prior art, a technical problem to be solved by the present invention is to provide a true three-dimensional volumetric imaging device and a display device. The true three-dimensional volumetric imaging device has a simple structure, and a corresponding imaging algorithm is simple. Thus, true three-dimensional volumetric display can be achieved more easily.

A technical solution employed to solve the technical problem of the present invention is a true three-dimensional volumetric imaging device, which includes an imaging light source, a light source adjusting unit, an imaging plate, and a movement driving unit, wherein, the light source adjusting unit is arranged between the imaging light source and the imaging plate, the imaging plate is connected to the movement driving unit, a light beam emitted from the imaging light source is incident onto the imaging plate after being adjusted by the light source adjusting unit, and the movement driving unit causes the imaging plate to oscillate in a direction parallel to an outgoing direction of the light beam emitted from the imaging light source.

Preferably, an oscillation period of the imaging plate is less than a visual persistence period of human eyes.

Preferably, the light source adjusting unit is a prism module, the light beam emitted from the imaging light source is at least partially incident onto the prism module, the prism module scans the light beam emitted from the imaging light source and adjusts a projection direction of the light beam, so that the light beam is projected onto different regions of the imaging plate.

Preferably, the prism module includes a first prism and a second prism which are noncoplanar and cross each other, the light beam emitted from the imaging light source is at least incident onto a noncoplanar crossing region of the first prism and the second prism, and the first prism and the second prism are capable of rotating around their central axes, respectively.

Further preferably, the central axis of the first prism and the central axis of the second prism are noncoplanar and are perpendicular to each other.

Preferably, the true three-dimensional volumetric imaging device further includes an imaging cavity, the cavity wall of the imaging cavity is transparent, the imaging plate is arranged in the imaging cavity, a wide surface of the imaging plate is perpendicular to a central axis of the imaging cavity, and the imaging plate is capable of oscillating in the imaging cavity along a direction parallel to the central axis of the imaging cavity.

Further preferably, a shape of the imaging cavity includes a cylinder, a cube, a rectangular parallelepiped, or a triangular prism, and a shape of the imaging plate is the same as a cross-section shape of the imaging cavity.

Preferably, the imaging light source is arranged outside the imaging cavity, the outgoing direction of the light beam emitted from the imaging light source is perpendicular to the imaging plate, and the imaging cavity is provided with an anti-reflection film at an outer side of the cavity wall which faces towards the imaging light source.

Preferably, the movement driving unit includes at least two driving components which are arranged outside the cavity wall of the imaging cavity with an interval therebetween, each of the driving components includes a motion connector which passes through the cavity wall of the imaging cavity to be physically connected to the imaging plate.

Preferably, the motion connector is a permanent magnet, each of the driving components further includes a support frame and a top electromagnet and a bottom electromagnet which are respectively arranged at the top and the bottom of the support frame, the permanent magnet is arranged between the top electromagnet and the bottom electromagnet, an induction coil is provided outside each of the top electromagnet and the bottom electromagnet, and a center of the top electromagnet, a center of the bottom electromagnet, and a center of the permanent magnet are located on a same straight line; or each of the driving components is a step motor, and the motion connector is an output shaft of the step motor.

Preferably, inside of the imaging cavity is vacuum, and a sealing element is further provided where the motion connector passes through the cavity wall of the imaging cavity to be physically connected to the imaging plate.

Preferably, the imaging plate is made of a material having a diffuse reflection property and a diffuse transmission property.

Further preferably, the imaging plate includes a substrate made of plastic or resin having high tenacity or a substrate made of glass having high hardness and high tenacity, and two wide surfaces of the substrate are subjected to a roughing treatment or provided with scattering particles.

Preferably, the true three-dimensional volumetric imaging device further includes an image data source, and the imaging light source is a laser source which emits a laser beam having a corresponding intensity and a corresponding duration according to the image data source.

Preferably, the imaging light source includes at least one monochromatic laser source, and a number of the prism modules in the light source adjusting unit is equal to that of the laser sources.

Further preferably, the imaging light source and the light source adjusting unit are located in a same light controlling shade, an opening of the light controlling shade faces towards the imaging cavity.

A display device including the true three-dimensional volumetric imaging device as described above.

The advantageous technical effects of the present invention are as follows. In the true three-dimensional volumetric imaging device, the true three-dimensional volumetric display of an image is achieved by adjusting a projection angle of the light beam emitted from the imaging light source, driving the imaging plate to oscillate in the imaging cavity along a direction parallel to the outgoing direction of the light beam emitted from the imaging light source, and using accumulation of two-dimensional image planes to generate the three-dimensional volumetric images. Thus, an algorithm is simpler, and a more complete volumetric object can be rendered.

Reference signs: 1—imaging light source; 2—imaging plate; 3—imaging cavity; 4—movement driving unit; 41—support frame; 42—top electromagnet; 43—permanent magnet; 44—bottom electromagnet; 45—induction coil; 5—light source adjusting unit; 51—first prism; 52—second prism; 6—light controlling shade; H—oscillation distance; 47—sealing element; 51*a*—central axis of a first prism; and 52*a*—central axis of a second prism.

DETAILED DESCRIPTION OF THE EMBODIMENTS

For better understanding the technical solutions of the present invention by a person skilled in the art, a true three-dimensional volumetric imaging device and a display device according to the present invention will be further described in detail with reference to the drawings and the following embodiments.

A true three-dimensional volumetric imaging device may includes an image data source, an imaging light source, a light source adjusting unit, an imaging plate, and a movement driving unit. The light source adjusting unit is arranged between the imaging light source and the imaging plate, and the imaging plate is connected to the movement driving unit. A light beam emitted from the imaging light source is incident onto the imaging plate after being adjusted by the light source adjusting unit, and the movement driving unit causes the imaging plate to oscillate in a direction parallel to an outgoing direction of the light beam emitted from the imaging light source. It should be understood that, the image data source is not necessary for the true three-dimensional volumetric imaging device. The true three-dimensional volumetric imaging device may achieve true three-dimensional volumetric imaging in a case where the light beam emitted from the imaging light source is incident onto the imaging plate after being adjusted by the light source adjusting unit, and the imaging plate oscillates in a direction parallel to the outgoing direction of the light beam emitted from the imaging light source. The true three-dimensional volumetric imaging device may load the image data source only when true three-dimensional volumetric imaging is to be performed using the image data source.

A display device includes the true three-dimensional volumetric imaging device as described above.

Embodiment 1

Figure 1:
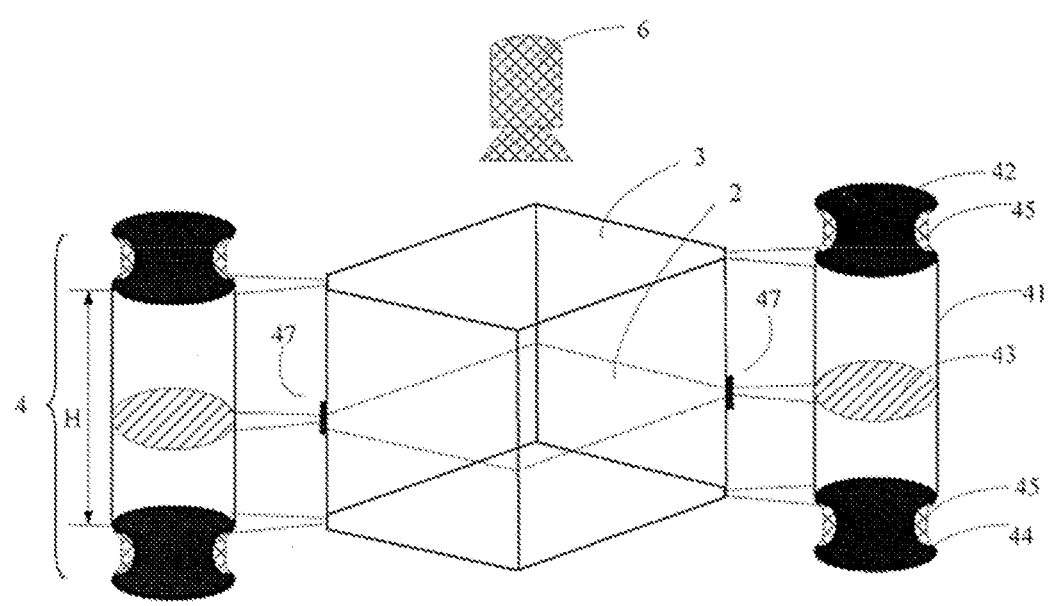
FIG. 1 is a schematic diagram showing a structure of a true three-dimensional volumetric imaging device according to Embodiment 1 of the present invention.
Figure 3:
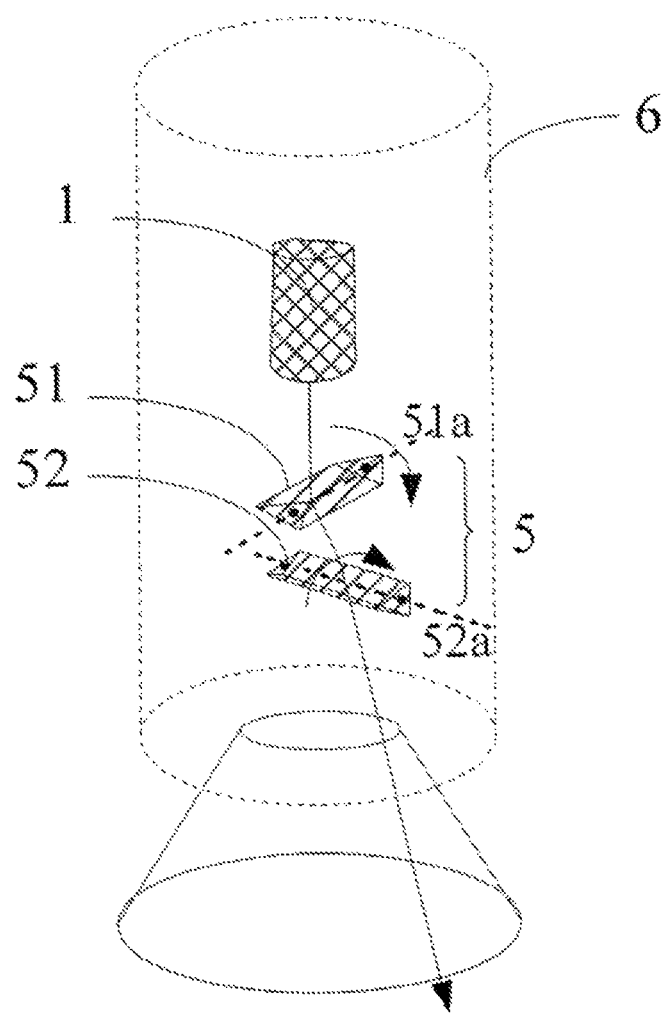
FIG. 3 is a perspective view of a light controlling cover as shown in FIG. 1.

The present embodiment provides a true three-dimensional volumetric imaging device. As shown in FIGS. 1 and 3, the true three-dimensional volumetric imaging device may includes an image data source (not shown in FIG. 1), an imaging light source 1 (in a light controlling shade 6 as shown in FIG. 1), an imaging plate 2, a light source adjusting unit 5 (in the light controlling shade 6 as shown in FIG. 1), and a movement driving unit 4. The light source adjusting unit 5 is arranged between the imaging light source 1 and the imaging plate 2, and the imaging plate 2 is connected to the movement driving unit 4. A light beam emitted from the imaging light source 1 is incident onto the imaging plate 2 after being adjusted by the light source adjusting unit 5, and the movement driving unit 4 causes the imaging plate 2 to oscillate in a direction parallel to an outgoing direction of the light beam emitted from the imaging light source 1.

In order to ensure that a height of a true three-dimensional volumetric image is controllable and to ensure a ratio of a volumetric image to another one during true three-dimensional volumetric display, the true three-dimensional volumetric imaging device further includes an imaging cavity 3, and cavity wall of the imaging cavity 3 is transparent. Wherein, the imaging light source 1 is arranged outside the imaging cavity 3, and the outgoing direction of the light beam emitted from the imaging light source 1 is perpendicular to the imaging plate 2. The imaging cavity 3 is provided with an anti-reflection film (not shown in FIG. 1) at an outer side of the cavity wall which faces towards the imaging light source 1. The anti-reflection film can be provided appropriately according to the characteristics of the imaging light source 1, so that the light beam emitted from the imaging light source 1 is subjected to complete specular reflection when it is incident onto the imaging cavity 3, and unnecessary diffuse reflection light beam will not occur on the side surface of the imaging cavity 3 due to diffuse reflection.

Wherein, the imaging plate 2 is arranged in the imaging cavity 3, and a wide surface of the imaging plate 2 is perpendicular to a central axis (e.g., a vertical central axis) of the imaging cavity 3. The imaging plate 2 can oscillate in the imaging cavity 3 along a direction parallel to the central axis of the imaging cavity 3. In FIG. 1, an oscillation distance H is an effective distance that the imaging plate 2 can move in the imaging cavity 3, i.e., a height of a true three-dimensional volumetric image which can be formed.

In the present embodiment, the light source adjusting unit 5 is a prism module. The light beam emitted from the imaging light source 1 is at least partially incident onto the prism module, and the prism module scans the light beam emitted from the imaging light source 1 and adjusts a projection direction of the light beam, so that the light beam is projected onto different regions of the imaging plate 2. Specifically, as shown in FIG. 3, the light source adjusting unit 5 includes at least one prism module. Each prism module includes a first prism 51 and a second prism 52 which are noncoplanar and cross each other. By employing two prisms which are noncoplanar and cross each other, projection points of the light beam on the imaging plate 2 can be adjusted in two dimensions, so that the light beam is projected onto the respective regions of the imaging plate 2. The light beam emitted from the imaging light source 1 is at least incident onto a noncoplanar crossing region of the first prism 51 and the second prism 52, and the noncoplanar crossing region refers to a crossing region of the first prism 51 and the second prism 52 in an orthogonal projection direction. The first prism 51 and the second prism 52 can rotate around their central axes 51a and 52a, respectively. Preferably, the central axis of the first prism 51a and the central axis of the second prism 52a are noncoplanar and are perpendicular to each other.

Based on the configuration as described above, the central axis of the first prism 51a and the central axis of the second prism 52a are respectively located in planes parallel to the imaging plate 2, and the first prism 51 and the second prism 52 respectively rotate around their central axes 51a and 52a, respectively, so that the line scanning determined by the first prism 51 and the second prism 52 is converted into the plane scanning in a plane parallel to the imaging plate 2. Thus, the scanning of a laser beam corresponding to imaging plate 2 is achieved. For example, a monochromatic laser beam emitted from a laser scans through the first prism 51 in a direction perpendicular to the central axis of the first prism 51a, and then scans through the second prism 52 in a direction perpendicular to the central axis of the second prism 52a. Thus, the scanning of the laser beam in an entire plane parallel to the imaging plate 2 can be achieved by the laser beam refracted by the first prism 51 and the second prism 52.

In the present embodiment, the imaging light source 1 and the light source adjusting unit 5 are located in a same light controlling shade 6, and an opening of the light controlling shade 6 faces towards the imaging cavity 3. A projection range of the light beam emitted from the imaging light source 1 is easily controlled by employing the light controlling shade 6. At the same time, the imaging plate 2 oscillates, so that the image data source can form a dynamic volumetric image.

In order to ensure that a balanced driving force can be applied to the imaging plate 2, the movement driving unit 4 includes at least two driving components which are arranged outside the cavity wall of the imaging cavity 3 with an interval therebetween. As shown in FIG. 1, preferably, the two driving components are arranged at two opposite sides of the imaging cavity 3, respectively. Wherein, each of the driving components includes a motion connector which passes through the cavity wall of the imaging cavity 3 to be physically connected to the imaging plate 2. In the present embodiment, the motion connector is a permanent magnet 43. Each of the driving components further includes a support frame 41 and a top electromagnet 42 and a bottom electromagnet 44 which are respectively arranged at the top and the bottom of the support frame 41, and the permanent magnet 43 is arranged between the top electromagnet 42 and the bottom electromagnet 44. An induction coil 45 is provided outside each of the top electromagnet 42 and the bottom electromagnet 44. A center of the top electromagnet 42, a center of the bottom electromagnet 44, and a center of the permanent magnet 43 are located on a same straight line. As shown in FIG. 1, preferably, the center of the top electromagnet 42, the center of the bottom electromagnet 44, and the center of the permanent magnet 43 are located on a same vertical line.

Figure 4:
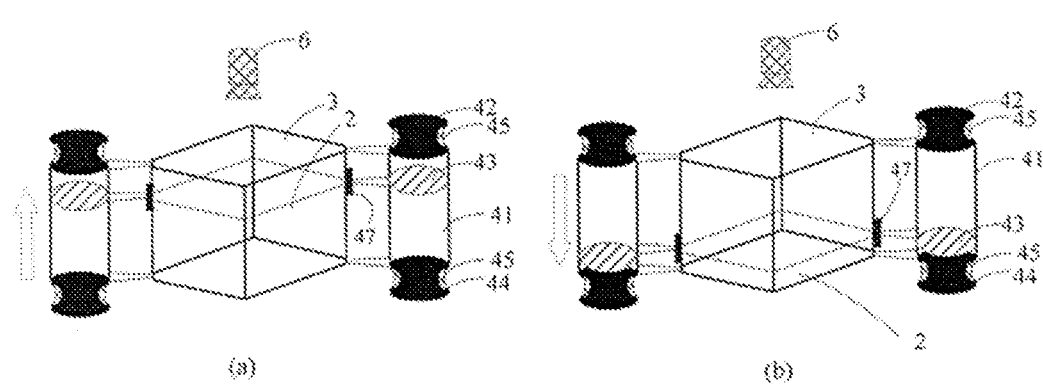
FIG. 4 is a schematic diagram showing the movement of an imaging plate in Embodiment 1 of the present invention.

As shown in FIG. 4, (a) when the induction coil 45 is forwardly powered on, the top electromagnet 42 and the bottom electromagnet 44 push the permanent magnet 43 to move upwards, and the permanent magnet 43 drives the imaging plate 2 to move upwards when it moves upwards; and (b) when the induction coil 45 is reversely powered on, the top electromagnet 42 and the bottom electromagnet 44 push the permanent magnet 43 to move downwards, and the permanent magnet 43 drives the imaging plate 2 to move downwards when it moves downwards. When the induction coil 45 is forwardly and reversely powered on repeatedly in a plurality cycles, the top electromagnet 42 and the bottom electromagnet 44 push the permanent magnet 43 to move upwards and downwards repeatedly, so that the imaging plate 2 is driven to oscillate upwards and downwards within a longitudinal length (i.e., the oscillation distance H) in the imaging cavity 3. In the present embodiment, an oscillation period of the imaging plate 2 is less than a visual persistence period of human eyes. What viewed by human eyes are not discrete two-dimensional pictures, but a three-dimensional volumetric image constituted by the two-dimensional pictures due to visual persistence of human eyes.

In order to ensure that the imaging plate 2 can oscillate in the absence of a resistive force within the imaging cavity 3, preferably, inside of the imaging cavity 3 is arranged to be vacuum, and a sealing element 47 is further provided where the motion connector passes through the cavity wall of the imaging cavity 3 to be physically connected to the imaging plate 2. Since the air within the imaging cavity 3 is evacuated, the imaging plate 2 moves in a longitudinal direction in the absence of air resistance. Thus, an oscillation movement without resistance can be achieved more easily, so as to achieve more complete and smoother volumetric image display.

Meanwhile, in order to prevent the imaging plate 2 from bending and fracturing during cyclic and repeated oscillation, a material used for forming the imaging plate 2 should be tough as much as possible, and a volume of the imaging plate 2 should not be too large. For example, the imaging plate includes a substrate made of plastic or resin (e.g., a PMMA resin) having high tenacity or a substrate made of glass or quartz having high hardness and high tenacity, so as to ensure that the imaging plate 2 will not bend, fracture, or break up during oscillation. In the present embodiment, the high hardness and the high tenacity relate to a material used for forming the substrate. Generally, a surface of the substrate made of plastic, resin, glass, or quartz tends to have defects, such as fragility, deformation, and the like, to a certain extend. In order to ensure the quality of the imaging device, the imaging plate 2 may have properties of high hardness and high tenacity, so as to ensure that the imaging plate 2 maintains good integrity and flatness during cyclic and repeated oscillation. Thus, the effect of true three-dimensional volumetric imaging can be ensured.

In the present embodiment, a preferable shape of the imaging cavity 3 includes a cylinder, a cube (which is taken as an example in FIG. 1), a rectangular parallelepiped, or a triangular prism, and a shape of the imaging plate 2 is the same as a cross-section shape of the imaging cavity 3. It should be understood that, a shape of the imaging cavity 3 is not limited to the above preferable shapes. Actually, in the present embodiment, it only needs that the inside of the imaging cavity 3 is preferably vacuum, the imaging cavity is easy to be manufactured, and a shape of the imaging plate 2 is the same as a cross-section shape of the imaging cavity. In a practical application, the imaging cavity may be designed appropriately according to existing manufacturing equipment or desired production cost.

In order to ensure that the light source has good light convergence property and controllability, the imaging light source is preferably a laser source which emits a laser beam having a corresponding intensity and a corresponding duration according to the image data source. Since the laser source has good light convergence property and wide color gamut, the imaging light source which is the laser source not only is easy to be controlled, but also has good color gamut.

Usually, a laser source generally emits monochromatic light, and a monochromatic true three-dimensional volumetric image may be formed by employing one laser. A color true three-dimensional volumetric image may be formed by using a plurality lasers and mixing light thereof. For example, a color true three-dimensional volumetric image corresponding to the image data source may be achieved by using a red laser, a green laser, and a blue laser, arranging the three lasers outside a same side of the imaging cavity 3, for example arranging over the top surface as shown in FIG. 1 (the three lasers should not be arranged outside the sidewall of the imaging cavity), and controlling the emission position, emission time, or the emission intensity of each of the three lasers. In a case where the imaging light source 1 includes at least one monochromatic laser source, the light source adjusting unit 5 includes at least one prism module accordingly, and a number of the prism modules is equal to that of the laser sources. Parameters of the prism modules, such as a position, an initial angle, and the like, can be configured according to requirements of imaging size, imaging precision, and the like.

Further, for the purpose of better effect of true three-dimensional volumetric display, the imaging plate 2 is made of a material having a diffuse reflection property and a diffuse transmission property. In a case where a substrate made of plastic, resin, glass, or quartz is employed, two wide surfaces of the substrate are subjected to a roughing treatment or provided with scattering particles, thereby increasing the scattering degree thereof.

Correspondingly, in the present embodiment, an imaging method using the true three-dimensional volumetric imaging device as describe above includes the following steps:

Step S1: causing the imaging light source to emit a light beam, or causing the imaging light source to emit a light beam according to an imaging data source.

In the present step, the imaging light source is a laser source, which can emit a laser beam having an inherent intensity and duration, or emit a laser beam having a corresponding intensity and a corresponding duration according to the image data source.

Step S2: adjusting a projection direction of the light beam emitted from the imaging light source, or adjusting a projection direction of the light beam emitted from the imaging light source according to the image data source.

In the present step, the projection direction of the light beam emitted from the imaging light source is adjusted by using a prism module. The prism module includes a first prism and a second prism which are noncoplanar and cross each other. The light beam emitted from the imaging light source is at least incident onto a noncoplanar crossing region of the first prism and the second prism, and the first prism and the second prism can rotate around their central axes, respectively.

Preferably, the central axis of the first prism and the central axis of the second prism are noncoplanar and are perpendicular to each other. For ease of controlling, preferably, the rotational speed of the first prism and the second prism are constant.

Step S3: projecting the adjusted light beam onto the imaging plate having a diffuse reflection property and a diffuse transmission property.

Step S4: causing the imaging plate to oscillate in a direction parallel to an outgoing direction of the light beam emitted from the imaging light source.

In the present step, for ease of controlling, preferably, an oscillation period of oscillation movement of the imaging plate is a constant period.

Figure 2:
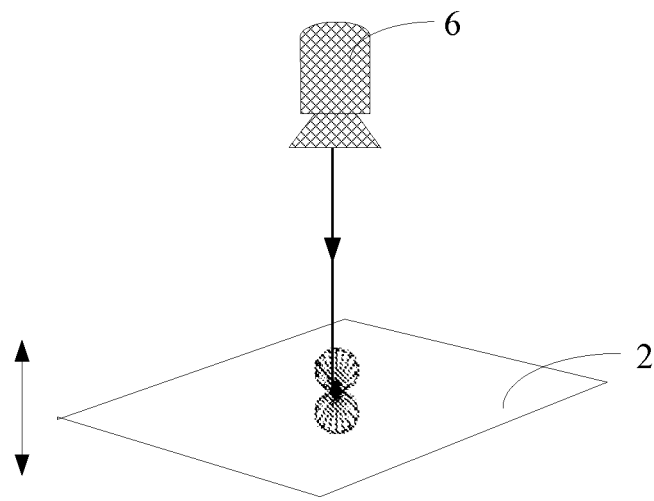
FIG. 2 is a schematic diagram showing the principle of true three-dimensional volumetric imaging according to Embodiment 1 of the present invention.

As shown in FIG. 2, in the present embodiment, the principle for true three-dimensional volumetric imaging by using the true three-dimensional volumetric imaging device as described above is as follows. The laser beam emitted from a laser will be subjected to diffuse reflection and diffuse transmission on the imaging plate 2 when it is incident onto the imaging plate 2. In this case, the incident point will be regarded as a light source by human eyes. A two-dimensional (flat) image may be constituted on the imaging plate 2 at a certain time by controlling emission time and emission intensity of the laser, and controlling corresponding movement positions of the laser source on the imaging plate 2. At the same time, during constitution of an image, the imaging plate 2 always oscillates in the longitudinal direction, so that a complete true three-dimensional volumetric display image is formed by accumulating two-dimensional images at different height.

The image data source in the present embodiment may be a static image, for example, a poster or a photo. The true three-dimensional volumetric imaging device according to the present embodiment is suitable for displaying a static image.

Embodiment 2

The present embodiment provides a true three-dimensional volumetric imaging device, which is mainly suitable for displaying a dynamic true three-dimensional volumetric image.

The true three-dimensional volumetric imaging device according to the present embodiment has the same configuration as that of the true three-dimensional volumetric imaging device according to Embodiment 1.

In the imaging method according to Embodiment 1, the image data source is a static image data source, thus, a position for setting a laser source in the imaging light source may be stationary, an emission intensity of a laser beam may be constant, a duration for the laser source to emit a laser beam may be a fixed period of time. However, in an imaging method according to the present embodiment, an image data source is a dynamic image data source. Although a position for setting a laser source in the imaging light source may be stationary, both an emission intensity and a duration for the laser source to emit a laser beam change dynamically according to the image data source.

Other steps of the imaging method of the true three-dimensional volumetric imaging device according to the present embodiment are the same as corresponding steps of the imaging method of the true three-dimensional volumetric imaging device according to Embodiment 1, and description thereof is omitted herein.

In the true three-dimensional volumetric imaging devices according to Embodiments 1 and 2, the true three-dimensional display of an image is achieved through using the principle of electromagnetic induction, driving the imaging plate in the vacuum imaging cavity to oscillate in the longitudinal direction by using electromagnetic oscillation.

Accordingly, the imaging methods of the true three-dimensional volumetric imaging devices according to Embodiments 1 and 2 integrate a true three-dimensional stereoscopic static imaging technology and a true three-dimensional stereoscopic dynamic imaging technology. Thus, the algorithms are simple, and easily to be achieved.

Embodiment 3

The present embodiment provides a true three-dimensional volumetric imaging device. Differing from those according to Embodiments 1 and 2, driving components in the true three-dimensional volumetric imaging device according to the present embodiment are step motors.

That is, in the present embodiment, the driving scheme of electromagnetic oscillation is replace with a driving scheme of step motor. Wherein, each of the driving components is a step motor, and the motion connector is an output shaft of the step motor.

Other structures of the true three-dimensional volumetric imaging device according to the present embodiment are the same as the corresponding structures of the true three-dimensional volumetric imaging device according to Embodiments 1 or 2, and the imaging method of the true three-dimensional volumetric imaging device according to the present embodiment is the same as that of the true three-dimensional volumetric imaging device according to Embodiments 1 or 2, description thereof being omitted.

In the true three-dimensional volumetric imaging device according to the present embodiment, the imaging plate in the vacuum imaging cavity is driven to oscillate in the longitudinal direction by using motors, thus, true three-dimensional display of an image is achieved.

In the true three-dimensional volumetric imaging device according to Embodiments 1 to 3, the true three-dimensional volumetric image is achieved by adjusting a projection angle of the light beam emitted from the imaging light source, driving the imaging plate to oscillate in an imaging cavity along a direction parallel to the outgoing direction of the light beam emitted from the imaging light source, and using accumulation of two-dimensional image planes. As compared with an existing true three-dimensional volumetric imaging device, the true three-dimensional volumetric imaging device according to the present invention can show a more complete volumetric object. At the same time, since the true three-dimensional volumetric image is achieved by using accumulation of two-dimensional image planes, an algorithm thereof is simple.

Embodiment 4

The present embodiment provides a display device, which includes the true three-dimensional volumetric imaging device according to any one of Embodiments 1 to 3.

The display device can be applied to many industries such as city planning, engineering design, landscape layout, or the like, and can show a more complete volumetric object, thereby reproducing volumetric image information better.

It should be understood that, the above embodiments are only exemplary embodiments for the purpose of explaining the principle of the present invention, and the present invention is not limited thereto. For a person having ordinary skill in the art, various improvements and modifications may be applied to the present invention without departing from the spirit and essence of the present invention. These improvements and modifications also fall within the protection scope of the present invention.

What is claimed is:

1. A true three-dimensional volumetric imaging device including an imaging light source, a light source adjusting unit, an imaging plate, and a movement driving unit, wherein, the light source adjusting unit is arranged between the imaging light source and the imaging plate, the imaging plate is connected to the movement driving unit, a light beam emitted from the imaging light source is incident onto the imaging plate after being adjusted by the light source adjusting unit, and the movement driving unit causes the imaging plate to oscillate in a direction parallel to an outgoing direction of the light beam emitted from the imaging light source;

wherein, the true three-dimensional volumetric imaging device further includes an imaging cavity, the movement driving unit includes at least two driving components which are arranged outside the a cavity wall of the imaging cavity with an interval therebetween, each of the driving components includes a motion connector which passes through the cavity wall of the imaging cavity to be physically connected to the imaging plate; and the motion connector is a permanent magnet, each of the driving components further includes a support frame and a top electromagnet and a bottom electromagnet which are respectively arranged at a top and a bottom of the support frame, a straight line connecting between a center of the top electromagnet and a center of the bottom electromagnet is parallel to a direction along which the imaging plate oscillates along with the permanent magnet, the top electromagnet and the bottom electromagnet are separated from each other by the permanent magnet arranged between the top electromagnet and the bottom electromagnet, two induction coils are provided outside the top electromagnet and the bottom electromagnet, respectively, the two induction coils are separated from each other, the permanent magnets of the at least two driving components all pass through the cavity wall of the imaging cavity to be physically connected to the imaging plate, and during the imaging plate oscillating in the direction parallel to the outgoing direction of the light beam emitted from the imaging light source, the center of the top electromagnet, the center of the bottom electromagnet, and a center of a portion of the permanent magnet within the support frame are always located on the straight line.

2. The true three-dimensional volumetric imaging device according to claim 1, wherein, an oscillation period of the imaging plate is less than a visual persistence period of human eyes.

3. The true three-dimensional volumetric imaging device according to claim 2, wherein, the light source adjusting unit is a prism module, the light beam emitted from the imaging light source is at least partially incident onto the prism module, the prism module scans the light beam emitted from the imaging light source and adjusts a projection direction of the light beam, so that the light beam is projected onto different regions of the imaging plate.

4. The true three-dimensional volumetric imaging device according to claim 3, wherein, the prism module includes a first prism and a second prism which are noncoplanar and cross each other, the light beam emitted from the imaging light source is at least incident onto a noncoplanar crossing region of the first prism and the second prism, and the first prism and the second prism are configured for rotating around their central axes, respectively.

5. The true three-dimensional volumetric imaging device according to claim 4, wherein, the central axis of the first prism and the central axis of the second prism are noncoplanar and are perpendicular to each other.

6. The true three-dimensional volumetric imaging device according to claim 1, wherein, the light source adjusting unit is a prism module, the light beam emitted from the imaging light source is at least partially incident onto the prism module, the prism module scans the light beam emitted from the imaging light source and adjusts a projection direction of the light beam, so that the light beam is projected onto different regions of the imaging plate.

7. The true three-dimensional volumetric imaging device according to claim 6, wherein, the prism module includes a first prism and a second prism which are noncoplanar and cross each other, the light beam emitted from the imaging light source is at least incident onto a noncoplanar crossing region of the first prism and the second prism, and the first prism and the second prism are configured for rotating around their central axes, respectively.

8. The true three-dimensional volumetric imaging device according to claim 7, wherein, the central axis of the first prism and the central axis of the second prism are noncoplanar and are perpendicular to each other.

9. The true three-dimensional volumetric imaging device according to claim 1, wherein, the cavity wall of the imaging cavity is transparent, the imaging plate is arranged inside the imaging cavity, a wide surface of the imaging plate is perpendicular to a central axis of the imaging cavity, and the imaging plate is configured for oscillating in the imaging cavity along a direction parallel to the central axis of the imaging cavity.

10. The true three-dimensional volumetric imaging device according to claim 9, wherein, a shape of the imaging cavity is a cylinder, a cube, a rectangular parallelepiped, or a triangular prism, and a shape of the imaging plate is the same as a cross-section shape of the imaging cavity.

11. The true three-dimensional volumetric imaging device according to claim 9, wherein, the imaging light source is arranged outside the imaging cavity, the outgoing direction of the light beam emitted from the imaging light source is perpendicular to the imaging plate, and the imaging cavity is provided with a anti-reflection film at an outer side of the cavity wall which faces towards the imaging light source.

12. The true three-dimensional volumetric imaging device according to claim 9, wherein, the imaging light source and the light source adjusting unit are located in a same light controlling shade, an opening of the light controlling shade faces towards the imaging cavity.

13. The true three-dimensional volumetric imaging device according to claim 1, wherein, inside of the imaging cavity is vacuum, and a sealing element is further provided where the motion connector passes through the cavity wall of the imaging cavity to be physically connected to the imaging plate.

14. The true three-dimensional volumetric imaging device according to claim 1, wherein, the imaging plate is made of a material having a diffuse reflection property and a diffuse transmission property.

15. The true three-dimensional volumetric imaging device according to claim 14, wherein, the imaging plate includes a substrate made of plastic or resin having high tenacity or a substrate made of glass having high hardness and high tenacity, and two wide surfaces of the substrate are subjected to a roughing treatment or provided with scattering particles.

16. The true three-dimensional volumetric imaging device according to claim 1, wherein, the true three-dimensional volumetric imaging device further includes an image data source, and the imaging light source is a laser source which emits a laser beam having a corresponding intensity and a corresponding duration according to the image data source.

17. The true three-dimensional volumetric imaging device according to claim 16, wherein, the imaging light source includes at least one monochromatic laser source, and a number of prism modules in the light source adjusting unit is equal to that of the laser sources.

18. A display device including the true three-dimensional volumetric imaging device according to claim 1.

* * * * *